Patented May 17, 1938

2,117,297

UNITED STATES PATENT OFFICE 2,117,297

PREINJECTION FLUID

Charles M. Carlsen, Spokane, Wash., assignor to The Chemical Corporation, Spokane, Wash.

No Drawing. Application July 16, 1935, Serial No. 31,624

1 Claim. (Cl. 27—22)

My present invention relates to an improved pre-injection fluid for use by morticians, preparatory to, and as a step in the process of embalming dead human bodies. As is well known to morticians, in the approved processes of embalming, the blood vessels are first cleared and cleansed of all obstructions; then an arterial is injected for the purpose of disinfecting and preserving the tissues; and finally a cavity fluid is injected for the purpose of eliminating fermentation of gases in the organs of the thoracic and abdominal cavities, and to preserve the tissues.

The pre-injection fluid of my invention is employed in the first mentioned step of embalming, and the fluid, solution, compound or composition is employed for the purpose of dissolving coagulated or clotted blood in order that the blood vessels may readily be drained, and also for the purpose of treating the tissues and walls of the blood vessels thereby preparing them to receive the fluid of the second step in the process of embalming.

In carrying out my invention, the following formula has been successfully employed:

| | |
|---|---:|
| Magnesium sulphate ounces | 24 |
| Sodium borate do | 4 |
| Trichlorbutyl alcohol grains | 240 |
| Glycerin C. P. fluid ounces | 36 |
| Oil of wintergreen, as a perfume | |
| A coloring matter | |
| Distilled water gallons | 3 |

In preparation of the composition or fluid, the trichlorbutyl alcohol, the perfuming agent as oil of wintergreen, and glycerin, are placed in a vessel or receptacle and thoroughly mixed to form a solution.

The magnesium sulphate and sodium borate are dissolved in water to effect a simple solution, in any suitable manner.

These two solutions are then thoroughly mixed together with a suitable coloring matter, to produce red, and with a quantity of water sufficient to produce three gallons of the fluid. The fluid is then filtered in any approved manner, and is ready to be diluted by the addition of water. As an example, eight ounces of the mixture or fluid prepared according to the above formula may be mixed with a quantity of water sufficient to produce one-half gallon of the solvent to be injected, but it will be understood that different proportions of the ingredients in the formula, and different proportions of the prepared fluid and water may be employed to meet different conditions that are encountered in the process of emblaming.

When the pre-injection fluid is used, the various ingredients perform their functions in cooperation to render the blood vessels in the best possible condition to insure success in the subsequent injections. For instance, the sodium borate, in the nature of an alkali in the fluid, maintains the desired alkalinity, and without the undesirable formation of gas. The solution with magnesium sulphate in an alkaline medium prevents coagulation of the blood and also dissolves and disintegrates coagulated and clotted blood when same has occured, thereby facilitating in the draining of the blood vessels.

By the presence of glycerin in the pre-injection fluid an agency is provided that is active in maintaining the walls of the blood vessels and the tissues in a flexible state, thus placing them in the best possible condition to receive and be penetrated by the alkaline solvent.

The osmotic action of magnesium sulphate, coupled with the delicate astringent effect of the trichlorbutyl alcohol prevents the deposit of water in the tissues, commonly known as "waterlogging", and thereby overcomes the objectionable feature of pre-injection treatments heretofore met with in embalming practice.

The resulting action of the pre-injection fluid is one of gentle solvency, and in the absence of preservatives, harsh astringents, or chemicals that tend to harden the tissues, this gentle action prepares the tissues to permit penetration by the alkaline solvent of the peripheral capillaries, thus facilitating the removal of post-mortem discolorations, and discolorations due to deposits of bile salts and pigments, commonly known as jaundice. The mild alkalinity of the prepared injection fluid or mixture, and the presence of the glycerin therein, serve as an ideal solvent for these bile salts and pigments.

Having thus fully described my invention, what I claim as new and desire to secure by Letters Patent is:—

A pre-injection fluid comprising sodium borate effective as a blood solvent; glycerine to maintain the flexibility of the blood vessels; magnesium sulphate effective as an osmotic; and trichlorbutyl alcohol effective as a mild astringent.

CHARLES M. CARLSEN.